Oct. 1, 1929. J. MASSOLLE ET AL Re. 17,448

TELEPHONE

Original Filed March 26, 1925 3 Sheets-Sheet 1

Inventors
Josef Engl,
Joseph Massolle,
and Hans Vogt.
By their Attorneys,
Ward, Crosby and Smith.

Oct. 1, 1929. J. MASSOLLE ET AL Re. 17,448

TELEPHONE

Original Filed March 26, 1925 3 Sheets-Sheet 2

Inventors
Joseph Engel
Joseph Massolle and
Hans Vogt

By their Attorneys
Ward, Crosby and Smith.

Oct. 1, 1929. J. MASSOLLE ET AL Re. 17,448

TELEPHONE

Original Filed March 26, 1925 3 Sheets-Sheet 3

Inventors
Joseph Engl
Joseph Massolle
Hans Vogt
By their Attorneys,
Wald, Crosby and Smith Reissued Oct. 1, 1929

Re. 17,448

UNITED STATES PATENT OFFICE

JOSEPH MASSOLLE, OF BERLIN-GRUNEWALD, HANS VOGT, OF BERLIN-WILMERSDORF, AND JOSEF ENGL, OF BERLIN-GRUNEWALD, GERMANY, ASSIGNORS, BY MESNE ASSIGNMENTS, TO WILLIAM FOX, OF WOODSBURGH, NEW YORK

TELEPHONE

Original No. 1,585,333, dated May 18, 1926, Serial No. 18,620, filed March 26, 1925. Application for reissue filed July 20, 1929, Serial No. 379,863.

The invention relates to improvements in telephones and particularly to loud speaking or other receiving telephones which are adapted to reproduce sound, such as speech and music, with great faithfulness and absence of distortion.

In its preferred form the invention comprises an electrostatic telephone, the invention, however, not being limited to this form.

In our Patent No. 1,550,381, Aug. 18, 1925, electrostatic telephone, granted Aug. 18, 1925, we have disclosed a telephone, the diaphragm of which is subdivided by annular clamping rings into a plurality of ring shaped portions which are adapted to vibrate independently of each other, these diaphragm portions each having a natural rate of vibration corresponding to some frequency within the acoustic range.

By the provision of a sufficient number of diaphragm annuli each having a different natural rate of vibration, the diaphragm will have resonance peaks corresponding to various fundamental tones and their overtones, and by the provision of a suitable damping factor, the resonance peaks thus formed will be flattened, so that the vibration of the diaphragm will correspond quite closely with the various frequencies which are to be reproduced throughout the acoustic range.

The present invention is in some aspects thereof an improvement upon that disclosed in our said co-pending application. In accordance with the present invention a plurality of diaphragm portions are provided, each of which possesses no decided natural rate of vibration as a whole. Each of these diaphragm portions or members resonates to a plurality of frequencies so that one of these diaphragm members or portions may respond to various frequencies within one range while another diaphragm member or portion responds to various frequencies extending through a different range. This is accomplished by the provision of diaphragm members or portions of irregular shapes; and in the preferred form of the invention this is accomplished by subdividing the diaphragm into a plurality of annular portions each of which is of a varying width. Thus the diaphragm may be clamped in position by eccentrically arranged clamping rings so mounted as to provide a plurality of annular diaphragm portions each of which may increase in width progressively through say 180°, or generally speaking throughout the arc of some radial angle of the annulus, the diaphragm annulus decreasing progressively in width throughout the remainder of its angular extent. With such an arrangement the various diaphragm portions may be caused to resonate to substantially all frequencies throughout an extended range. In the preferred arrangement, the highest individual natural rate of vibration of one diaphragm annulus or portion will be rather close to the lowest natural rate of vibration of an adjacent diaphragm portion, it being thus possible to produce a device in which there is a fairly uniform variation of the natural rates of vibration of the diaphragm from a very low level to a high level within the acoustic range.

An object of the invention is the provision of improved devices of the character referred to above.

Other objects of the invention comprise the provision of improved devices whereby sound may be reproduced with a minimum of distortion and preferably by a diaphragm, the total area of which is sufficient to render the use of an amplifying horn unnecessary, when the device is used as a loud speaker for reproducing the sound in an auditorium or the like.

The invention accordingly consists in the improved arrangements and combinations of parts and features of construction all as will be more fully described in the following specification, and as will be particularly pointed out in the appended claims.

In order that the invention may be more thoroughly understood attention is herebv drawn to the accompanying drawings forming part of the invention and illustrating by way of example certain preferred embodiments of the invention.

Referring to the drawings, Fig. 1 represents a face view of one form of telephone, operated electro-magnetically, and comprised within the invention;

Figure 1:
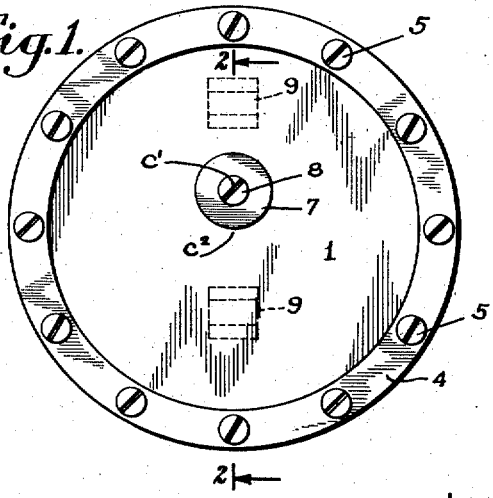
Figure 2:
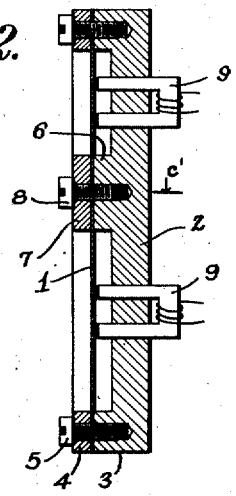
Fig. 2 is a vertical section taken on line 2—2 of Fig. 1.

Referring to the drawings, the construction shown in Figs. 1 and 2 is illustrated as applied to an electro-magnetic telephone, but it should be understood that this is merely by way of example. The diaphragm 1 is supported about its periphery and also at a point eccentric with respect to the diaphragm. A supporting plate 2 is illustrated having a peripheral forwardly extending flange against which the edge portion of the diaphragm seats and to which it is secured, as for example, by means of the clamping ring 4 between which and the surface of seating flange 3 the edge portion of the diaphragm is clamped by suitable means such as screws 5. The plate 2 is also provided with a forwardly extending boss 6, against which the diaphragm is clamped by suitable means such as a circular plate 7, a screw 8 being illustrated as extending through member 7 and the diaphragm and into the boss 6.

It will be noted that the center line C′ of member 7 and boss 6 is spaced somewhat away from the center $C^2$ of the diaphragm. The portion of the diaphragm which is free to vibrate is accordingly an annulus of varying width, bounded at its inner edge by the periphery of the clamping member 7, and bounded at its outer edge by the inner edge of the clamping ring 4.

In the form of construction shown in the drawing, electro magnets 9—9 are indicated, diagrammatically, as being supported by plate 2, in position to actuate the diaphragm in response to varying currents passing through the electro-magnet circuit. Any desired number of these electro-magnets may be used, the same preferably being spaced at points intermediate the clamping member 7 and the outer clamping ring 4. It should be understood that, if the invention be embodied in an electro-static telephone instead of an electro-magnetic telephone, capacity surfaces will take the place of the electro-magnets, similar constructions being described hereinafter in connection with the following figures of the drawing.

In the construction illustrated in Figs. 1 and 2 the varying width of the vibratory diaphragm annulus causes the same to have different natural rates of vibration which vary in accordance with the varying widths of the diaphragm as explained. The diaphragm will accordingly resonate to a plurality of different frequencies throughout a more or less extended range.

Figure 3:
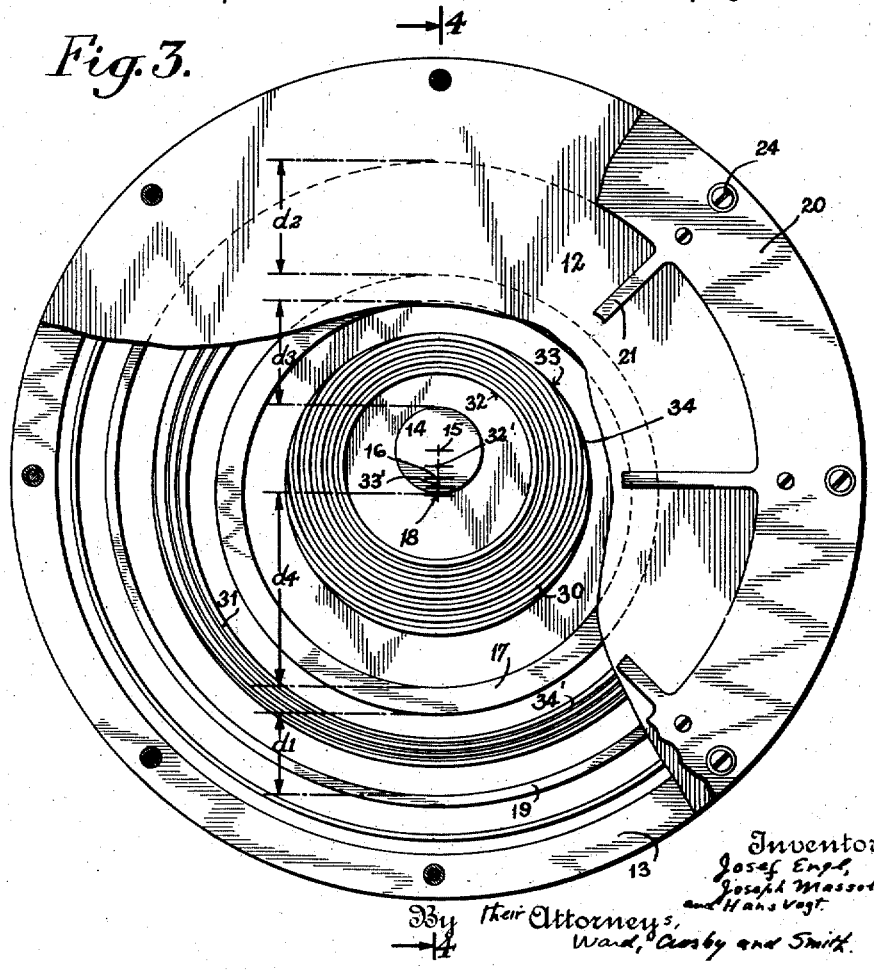
Fig. 3 is a face view of a modified form of construction embodying an electro-static telephone, certain parts being broken away.
Figure 4:
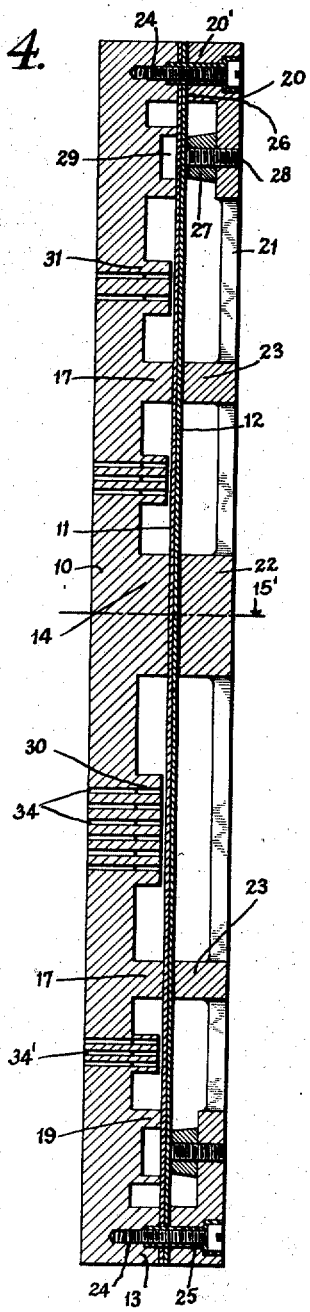
Fig. 4 is a vertical section on line 4—4 of Fig. 3, taken on an enlarged scale.

Referring next to the form of construction shown in Figs. 3 and 4 of the drawings, a construction is shown in which the diaphragm is subdivided into a plurality of annular portions, each of varying width, and each having a range comprising a plurality of natural rates of vibration. This construction is shown as applied to an electrostatic or condenser type of telephone, which constitutes the preferred form of construction.

In the construction illustrated, a fixed condenser plate 10 is shown with which cooperates movable diaphragm 11. This diaphragm constitutes the movable element of the electro-static telephone and in the preferred form of construction the diaphragm is formed of insulating material carrying a coating 12 of electrically conducting material. Preferably the diaphragm is formed of an exceedingly thin disc of mica, which is preferably coated with a suitable conducting metal. The conductive coating may, for example, be a thin silver coat deposited on the diaphragm from a solution comprising silver nitrate and other substances, the invention, however, not being limited in this respect. The sheet of mica used in the diaphragm is preferably of a thickness of only about 3/100 of a millimeter, while the diameter of the diaphragm is preferably quite large, as for example about ½ meter, the invention not, however, being limited to such dimensions. It is noted, however, that mica is particularly well adapted for use in our preferred construction, since a uniform sheet of mica may be obtained, by a splitting process so that it is possible to obtain a sheet of a thickness as slight as 1/100 of a millimeter, and of a diameter, for example, ½ meter. Such extreme thinness and large diameter are possible because of the high tensile strength of the mica. The advantages of mica for the desired purpose are explained in our co-pending application, Serial No. 518,425, referred to. In our preferred construction the diaphragm is placed under a considerable tension, which may be nearly as great as the elastic limit of the mica, it being noted that the elastic limit of mica is exceedingly high in relation to its tensile strength. The mica stands such high tension exceedingly well in practice. It should be noted that the exceeding thinness of the mica diaphragm makes for lightness and absence of inertia, and it also should be noted that the hard smooth surface of the mica better fits the same for the propagation of sound waves than would a porous or non-uniform surface.

The diaphragm is clamped against suitable seating surfaces, which preferably are integral with the fixed plate 10. In the construction illustrated, plate 10 is provided with an annular outer rim portion 13, which is concentric with the plate and against which the edge portion of the diaphragm may be seated. In the construction shown the plate 10 is also provided with a boss 14 against which the diaphragm is clamped, this seating portion 14 being eccentrically situated with respect to the plate 10 and with respect to the diaphragm. It will be noted that, in the construction shown, the center line of boss 14, at 15, is somewhat separated from the center line 16 of plate 10.

A seating ring 17 surrounds boss 14, this ring preferably being concentric with a point, such as point 18, Fig. 3, which is somewhat separated from the centers both of boss 14 and the plate 10 itself. When the diaphragm is clamped against seating surfaces 14 and 17, an annular vibrating portion will thus be provided between seating portions 14 and 17, which will be of a width which varies continuously, first increasing uniformly throughout a portion of its circumference and then uniformly decreasing in width throughout the remainder of its circumference.

Another annular vibrating diaphragm portion is formed between the eccentric ring 17 and an outer seating ring, which, in the present construction, takes the form of a ring 19, which may be concentric with the plate 10 itself. This outer diaphragm portion, bounded by the eccentric ring at its inner edge and the concentric ring at its outer edge, will, therefore, be a diaphragm portion of ring shape, generally speaking, but of a varying width. The space between ring 19 and the outer edge of the plate 10, in the construction illustrated, is utilized for tensioning and clamping the diaphragm.

The diaphragm is clamped in position by means of a construction which comprises pressure rings or the equivalent, this preferably taking the form of a spider having an outer annular rim 20 and radiating spokes or arms 21. This spider construction is provided with a boss 22 which is adapted to align with the eccentric boss 14 on plate 10 when the rim 20 of the spider is aligned with the outer edge of plate 10. The spider is also provided with an eccentric ring 23, which is adapted to align with the eccentric ring 17 on plate 10. All of the parts described of the spider may be formed, if desired, as an integral metal construction, which may, for example, very readily be cast.

In assembling the plate, diaphragm and clamping member therefor, the diaphragm is positioned against the plate 10 with conductive coating 12 on the side of the diaphragm away from the plate. The spider may then be secured to the plate by means of screws 24 or other suitable securing devices passing through the rim portion 20 of the spider and through the edge portion of the diaphragm and into the rim portion of plate 10. Preferably insulating material 25 is provided about each of the screws 24 to prevent the formation of any creeping paths for electrical currents along the screws from the spider to the fixed plate. The conductive coating 12 on the diaphragm may extend radially only so far, if desired, as the inner edge 26 of the faced clamping portion 20′ of the rim of the spider member, or if desired the conductive coating may be continued to the outer periphery of the diaphragm, which may be at the outer edge of the plate, it being noted that the mica body or base of the diaphragm serves as an insulation beteen the parts.

The diaphragm may be tensioned by suitable devices such, for example, as peripherally arranged members 27, which may be carried or engaged by screws 28 threaded through suitable openings in rim 20 of the spider member. These pressure devices 27 may be of wedge shape or other suitable shape, and are caused to press against the diaphragm to tension the latter as desired. Plate 10 may be provided with recessed portions 29 in alignment with the pressure devices 27, the diaphragm being pressed into these recesses by members 27 as the tensioning proceeds. Preferably the diaphragm is tensioned up to a point quite close to the elastic limit of the mica, as stated above.

The fixed plate 10 is provided with capacity surfaces intermediate the clamping or seating portions of the plate, which capacity surfaces are to serve as the fixed plate member of the device with which the adjacent portions of the conductive coating carried by the diaphragm will co-act. As shown, these fixed capacity surfaces may take the form of ring shaped members integral with the body of plate 10. These capacity surfaces are preferably rings of varying widths, positioned intermediate the clamping or seating portions of the plate, the fixed capacity rings being widest at points at which the corresponding diaphragm annulus has the greatest width and vice versa.

In the construction shown, one fixed capacity annulus 30 is intermediate the boss 14 and the seating ring 17, and an outer capacity annulus 31 is positioned intermediate rings 17 and 19. As stated, these capacity surfaces are preferably formed of varying widths. Thus the annular surface 30 may be bounded on the inside by a circle 32, the center of which is at a point 32′, while the ring 30 is bounded on the outer side by a circle 33, the center of which is at a different point such, for example, as point 33′. Similarly the outer capacity annulus 31 is of varying width having its inner and outer edges bounded by circles which are formed about different points as centers. It will be noted that the construction described gives the capacity surface in each instance a varying width, which may be widest at a point at which the corresponding diaphragm portion is the widest.

The seating rings or portions 14, 17 and 19 and the fixed capacity surface rings 30 and 31 are provided with very accurately faced upper surfaces so that the diaphragm when at rest will be separated from the fixed capacity surfaces by a very small gap, the capacity surfaces being set back from the seating surfaces. This gap, for example, may be a matter of a very few one hundredths of a millimeter. The accurate establishment of this distance, in the construction illustrated is provided by the accuracy with which the seating surfaces and fixed capacity surfaces of plate 10 are finished, and variation in the width of the gap between the diaphragm and the fixed capacity surfaces is prevented by the fact that the parts which establish the gap are all formed of metal, having the same co-efficient of expansion throughout.

The close adjustment of the diaphragm to the fixed capacity surfaces causes a damping of the vibrations of the diaphragm, which damping is desired, but not to as great an extent as would be provided by the construction described. Accordingly, the damping effect may be somewhat reduced by the provision of suitable openings through the condenser plate 10 through which the air in the gap between the diaphragm and the fixed capacity surfaces may escape to greater or less extent during the vibration of the diaphragm. In the construction shown the openings for the escape of the air preferably take the form of concentric circular channels extending entirely through the fixed capacity ring portions 30 and 31 of the plate 10. These circular grooves 34, in the case of the inner condenser ring 30, may, for example, be formed about the point 32′ as a center. Some of these circular channels will extend entirely through 360°, entirely around the fixed capacity portion 30 of the plate, while some of these circular channels 34 will extend through less than 360° of length since they will run out through the outer peripheral surface of ring 30, with which they are eccentric. The circular channels 34′, formed through the outer capacity ring 31, are similar. The rings of metal intermediate the circular channels 34 and 34′ are, of course, held together by suitable connecting portions of the metal which may bridge across the various circular channels at points which may, for example, be out of alignment with each other.

In the construction described, the vibrating diaphragm portion intermediate the seating portions 17 and 18 of the plate will have various individual rates of vibration extending through one range of acoustic frequencies, while the outer diaphragm annulus between seating rings 17 and 19 will have various other natural individual frequencies extending through a different range of the acoustic frequencies. The outer diaphragm annulus as arranged will have a higher range of frequencies than the inner diaphragm annulus and the arrangement preferably is such that the lowest natural frequency of the outer annulus is nearly the same as the highest natural rate of the inner annulus. This equality of the lowest natural rate of the outer diaphragm portion with the highest natural rate of the next adjacent inner diaphragm portion may be arranged by making the least width of the inner diaphragm annulus substantially equal to the greatest width of the outer diaphragm annulus.

With such an arrangement as many eccentric diaphragm rings may be arranged one with another as is required, so that the range of natural vibration of the diaphragm may extend substantially from the lowest up to the highest acoustic frequencies which will have to be reproduced. In case such an arrangement requires a telephone having too great a total diameter, a plurality of such telephones may be used, and this is in fact the preferred arrangement.

In the construction as illustrated, the highest frequency of one diaphragm portion may, as stated, be substantially equal to the lowest natural frequency of the adjacent diaphragm annulus. This is evidenced by substantial equality of the smallest width of the inner diaphragm annulus, indicated at $d^3$, with the greatest width of the outer diaphragm annulus, indicated at $d^2$, the reference characters $d'$, $d^4$, $d^3$ and $d^2$ being used to indicate the respective widths of the diaphragm portions from the bottom to the top of the diaphragm along the central vertical axis, referring to Fig. 3. With this arrangement, however, an absolutely uniform variation of the natural rates of vibration of the entire diaphragm is not produced. Uniform variation throughout the entire diaphragm is possible when the widths of one diaphragm portion overlap the widths of the adjacent portion to the extent of 90° of angular displacement, and such an arrangement may readily be accomplished within the present invention. This arrangement may be used when two or more telephones are used in place of a single one because of the fact that one telephone would be too large, as stated above. In this case the several telephones may have their widths of vibratory diaphragm portions displaced to the extent of 90° with reference to one another.

To make the above matter of overlapping widths somewhat clearer, it should be noted that each diaphragm annulus increases progressively in width from its greatest width, as at $d^2$, to its least width, at $d'$, where $d^3$ and $d'$ are illustrated as being on the vertical axis, and that accordingly the width of any annulus, such as the outer annulus, is intermediate its greatest and least widths at the intermediate point, that is, on the horizontal axis, or 90° away from either the $d'$ or the $d^2$ position. For the best distribution of resonance frequencies, therefore, the least width, $d^3$, of the inner annulus should approximately equal, not the greatest width, $d^2$, of the outer annulus, but the width of the outer annulus at a point intermediate $d'$ and $d^2$, in which case width $d^3$ would of course be less than width $d^2$ of the outer annulus aligned therewith, and greater than width $d'$.

The diaphragm rings may and preferably are so calculated that approximately equally large surfaces are operative at all frequencies whereby all frequencies are reproduced in proper proportion one to another.

Figure 6:
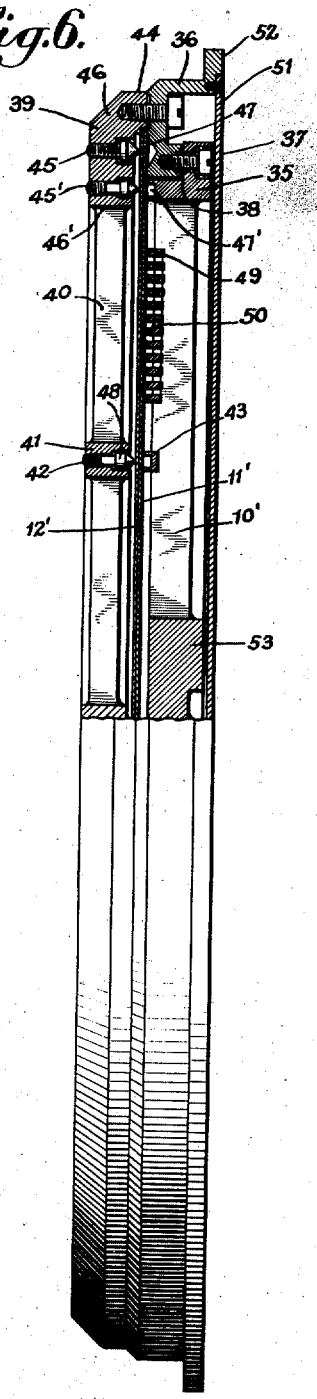
Fig. 6 is a section taken on line 6—6 of Fig. 5.
Figure 5:
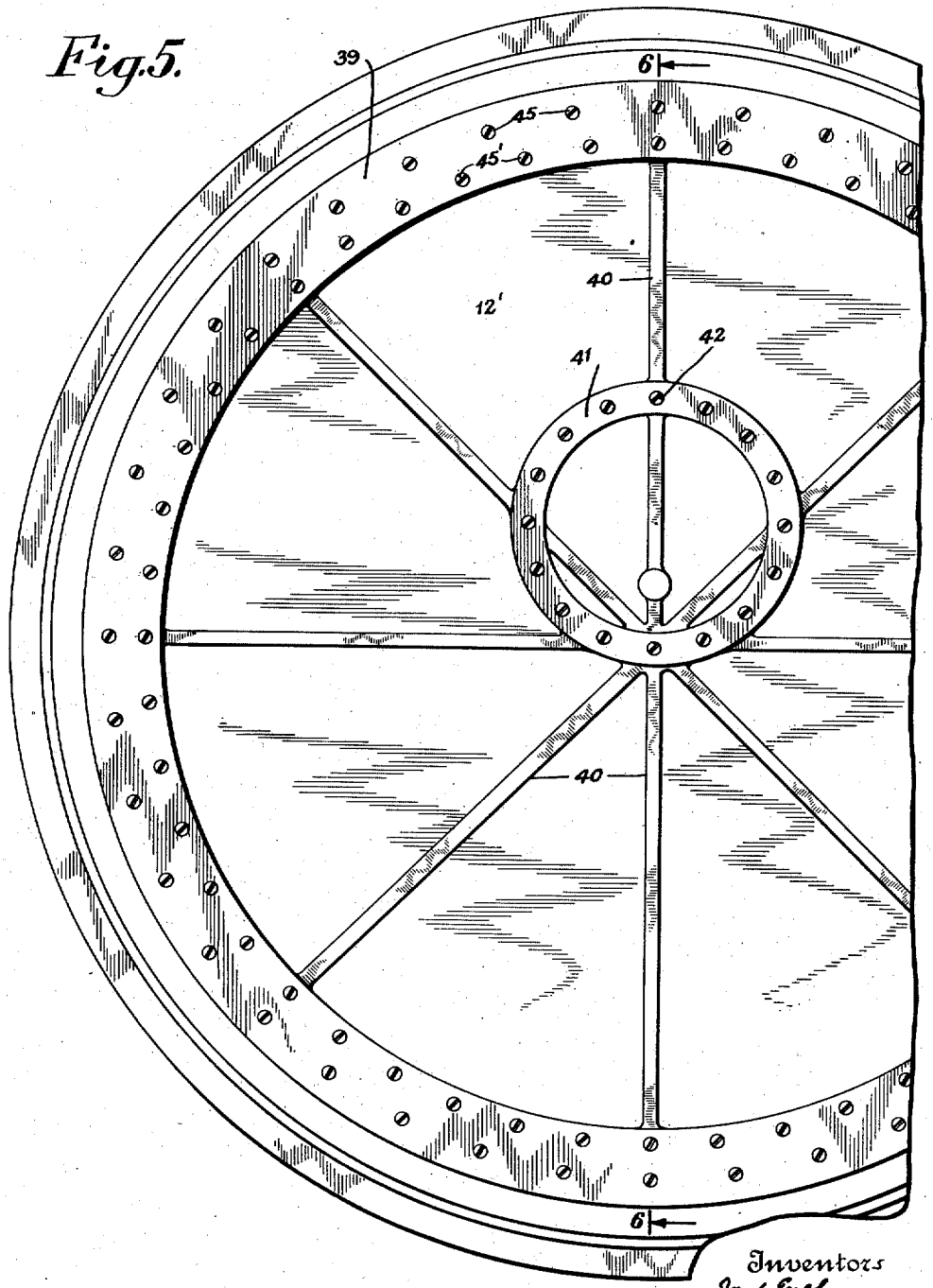
Fig. 5 is a partial front elevation of a modified form of electro-static telephone.

A modified form of construction is shown in Figs. 5 and 6. In this case the diaphragm 11′, having a conductive coating 12′, is secured in position between the fixed condenser plate 10′ and a spider member. The diaphragm is shown as clamped about its outer periphery, by devices which are concentric with the diaphragm itself, and about one inner circle which is eccentric with the diaphragm so as to produce a single vibratory diaphgram annulus of varying width.

In the construction illustrated, the plate 10′ has a ring portion 35 which is secured to an outer flanged ring 36 by means, for example, of screws 37 extending through a peripheral flange of rim 35 and into ring 36, insulating material 38 preferably being used about screws 37 and between the adjacent faces of rim 35 and ring 36. The clamping or pressure applying member comprises an outer concentric rim portion 39, together with radial arms 40. An eccentric ring 41 is carried by the arms 40. Clamping and pressure applying members 42 extend through this ring and are adapted to press the adjacent portion of the diaphragm against correspondingly positioned seats 43, formed in the fixed condenser member 10′.

The ring 36 to which the fixed plate 10′ is secured is fastened to the rim 39 of the spider member by means, for example, of screws 44 which extend peripherally around the device. The diaphragm is secured under tension at its outer edge by means of clamping and tensioning devices 45, 45′ which extend through the rim 39 of the spider member in two concentric rows one within the other.

These clamping members may comprise small wedge shaped blocks 46, 46′, seated in suitable openings in the rim 39 and bearing against the adjacent surfaces of the diaphragm. These pressure applying members bear with line contact against the diaphragm and may be forced more or less tightly against the diaphragm by the small screws 45, 45′. Suitable recesses 47, 47′ are provided in the face of ring 36 and rim 35 of the fixed plate construction respectively in which the adjacent portions of the diaphragm will be pressed when the clamping members are tightened. Screws 42, extending through the eccentric ring 41, are similarly caused to operate pressure applying members 48, which are similar to members 46 and 46′.

The plate 10′ is provided with a fixed capacity surface 49 which extends in the form of a ring of varying width around the device intermediate the circles along which the diaphragm is clamped at 48 and 46′. This annular capacity surface is only illustrated in part, since it will be understood that its width may vary throughout its angular extent in the same manner as was explained in connection with Fig. 3. Air in the gap between the fixed capacity surface and the diaphragm may be relieved by the provision of channels 50 which may be formed in a similar manner to the channels 34, described in connection with Figs. 3 and 4.

The capacity surface 49 is set back slightly from the seating surfaces on which the diaphragm will be clamped, adjacent the recesses 43 and 47′ so as to establish a slight gap between the fixed capacity surface and the diaphragm as was explained in connection with the construction shown in Figs. 3 and 4. The construction may be completed by a cover plate 51 which may be secured to the rim flange 36 of the plate construction by means of screws 52 so as to cover over the plate construction together with the screws 37 and 44.

In the construction described, the diaphragm is both clamped and placed under the desired tension by suitable adjustment of the pressure devices 48, 46′ and 46, no screws or other devices passing through the diaphragm itself. It will, of course, be understood that similar clamping and tensioning means may be used, if desired, in connection with the form of construction shown in Figs. 3 and 4. The fixed plate member 10′ may, if desired, be constructed in the form of a spider instead of in the form of a solid plate, in which case the member 10′ will comprise the rim 35 connected to the hub 53 by means of radial arms which carry the fixed capacity surface rings 49.

It will be understood that electrical connections are to be suitably made to the fixed and movable members of the condenser telephone. Thus in the form shown in Figs.

3 and 4 one connection is, of course, made to the plate 10 and the other connection to a suitable point such as the rim 20 of the spider, which, of course, is in contact with the conductive coating 12 of the diaphragm. In the form shown in Figs. 5 and 6 suitable connection may be made with the plate member 10′ and with the rim 39 of the spider construction.

The device, as described, in its various forms, particularly in the forms illustrating the same, as an electrostatic telephone, is particularly well adapted for use as a loud speaker or sound reproducer, which may be employed, for example, to reproduce sound in theaters or concert halls, or the like. When so used, sufficiently loud reproduction may be given without the use of any amplifying horns or the like, whereby the errors of reproduction due to such devices are obviated, and this is obviously true because of the considerable size of the diaphragm which is preferably employed and by the employment of two or more similar devices if necessary, as described above. In this connection it will, of course, be understood that the electrical currents operating the device may be suitably amplified as by means of the usual vacuum tube amplifiers, so that the diaphragm portions may be given a sufficient amplitude of vibration in case loud reproduction is desired. It will also be noted that the device, because of its large number of natural rates of vibration, provides for vibration of the diaphragm in resonance with a considerable number of acoustic frequencies which are to be reproduced whereby resonance peaks are formed throughout the entire range of frequencies which are to be reproduced. Distortion in reproduction is, however, prevented by the damping effect provided, so that the resonance peaks will be flattened. Accordingly, in a graph or characteristic curve portraying the operation of the diaphragm at all frequencies reproduced, the tops of the resonance peaks will be connected together by a smooth curve which is substantially the same as that which would represent the correct vibration of the diaphragm for the various frequencies if the diaphragm had no natural rates of vibration at all. That is to say, we consider it impractical to so arrange such a large diaphragm as we prefer to use, that the natural rate of vibration of the same will be outside the acoustic range; and, accordingly, we provide for as large a number of natural rates of vibration within the acoustic range as is possible and obtain the effects described.

It should be understood that the invention is not limited to the exact details of the construction which have been particularly described, but that the same is considered to be of a considerable breadth as is indicated by the scope of the appended claims.

What we claim is:

1. In a telephone, the combination of a diaphragm, a plate, and means for clamping the diaphragm to the plate, in spaced relation thereto, comprising rings eccentric to the diaphragm to provide vibratory diaphragm portions having different natural rates of vibration.

2. In a telephone, the combination of a diaphragm, a plate, and means for clamping the diaphragm immovably to the plate, about the periphery of the diaphragm and at a point eccentric with respect to the diaphragm, so as to provide a complete annular diaphragm portion of varying width spaced from said plate and surrounding said point.

3. In a telephone, the combination of a diaphragm, a plate, and means for clamping the diaphragm to the plate, about the periphery of the diaphragm and about a circle eccentric with respect to the diaphragm and intermediate the center and periphery thereof, so as to provide a vibratory diaphragm portion extending completely around said circle.

4. In a telephone, the combination of a diaphragm, a plate, and means for so clamping the diaphragm to the plate as to provide a plurality of complete ring shaped diaphragm portions, eccentric to the diaphragm, of varying widths and having different natural rates of vibration.

5. In a telephone, the combination of a diaphragm, a member to which the same is secured, and means for so clamping the diaphragm immovably to said member as to provide a vibratory diaphragm portion in the shape of a complete annulus of a width uniformly increasing throughout a portion of the angular extent of the annulus, and uniformly decreasing throughout the remainder of the angular extent of the annulus.

6. In a telephone, the combination of a diaphragm, a member to which the same is secured, and means for so clamping the diaphragm immovably to said member as to provide a vibratory diaphragm portion in the shape of a complete annulus of varying width, whereby the diaphragm will have a plurality of different natural rates of vibration throughout its area.

7. In a telephone, the combination of a diaphragm, a member to which the same is secured, and means for so clamping the diaphragm to said member as to provide a pair of separately-vibratory diaphragm portions, each in the shape of an annulus of varying width, one surrounding the other, each annulus having a plurality of different natural rates of vibration, the rates of vibration to which one annulus responds lying within one range, and the rates of vibration to which the second annulus responds lying within a different range.

8. In a telephone, the combination of a diaphragm, a member to which the same is secured, and means for so clamping the diaphragm to said member as to provide a plurality of separately-vibratory diaphragm portions, each in the shape of an annulus of varying width, said annuli being radially one within the other, each annulus having a range of frequencies to which it resonates, the lowest natural frequency of one annulus being close to the highest natural frequency of the adjacent annulus on one side thereof.

9. In a telephone, the combination of a diaphragm, a fixed condenser plate having a seating surface and a capacity surface, and means for clamping said diaphragm against said seating surface so as to provide a vibratory annular diaphragm portion of varying width separated from said capacity surface by a slight gap.

10. In a telephone, the combination of a diaphragm having an effective vibratory portion of annular shape with varying width, an annular capacity surface separated from said diaphragm by a slight gap, and means for securing said parts in position, with said diaphragm under tension.

11. In a telephone, the combination of a diaphragm of irregular shape, calculated to resonate locally to various frequencies, a plate closely adjacent to said diaphragm to produce a damping effect, said plate having openings therethrough to somewhat relieve the damping effect, and means for securing said parts in position with said diaphragm under tension.

12. In a telephone, the combination of a diaphragm of irregular shape, calculated to resonate locally to various frequencies, said diaphragm being of insulating material with a conductive coating, a condenser plate closely adjacent to the insulated side of said diaphragm, and means for securing said parts in position.

13. In a telephone, the combination of a diaphragm having a plurality of separated parts each having a plurality of different natural rates of vibration, supporting means, and means for securing said diaphragm thereto under tension, and for separating the parts of said diaphragm.

14. In a telephone, the combination of a diaphragm, a member to which the same is secured, and means for so clamping the diaphragm to said member as to provide a pair of separately-vibratory diaphragm portions, each in the shape of an annulus of varying width, one surrounding the other, each annulus having a plurality of different natural rates of vibration, the rates of vibration to which one annulus responds lying within one range, and the rates of vibration to which the second annulus responds lying within a different range, the outer annulus responding to a higher range of frequencies than the inner.

15. In a telephone, the combination of diaphragm means, comprising a plurality of annuli of varying width, one radially within the other, supporting means, and means for securing said annuli thereto about their peripheries, each annulus having a plurality of different natural rates of vibration, the range of frequencies of one annulus being different from the range of another.

16. In a telephone, the combination of diaphragm means, comprising a plurality of portions of irregular shape, supporting means, and means for securing said portions thereto about all their edges.

17. In a telephone, the combination of diaphragm means, comprising a plurality of portions of irregular shape, formed of insulating material and having a conducting coating thereon, a fixed condenser plate, and means for securing said portions in position spaced a slight distance from said plate, with the conductive coatings on the opposite side from said plate, said coating being connected together electrically.

18. In a telephone, the combination of diaphragm means, comprising a plurality of portions of irregular shape, formed of insulating material and having a conducting coating thereon, each portion being adapted to resonate to a different range of frequencies, capacity surfaces spaced slight distances from the insulated sides of said portions, and means for securing said parts in position and for electrically connecting together said capacity surfaces, and said diaphragm means portions.

19. In an electrostatic telephone, the combination of movable plate means, comprising a plurality of irregularly shaped diaphragm portions, each portion being adapted to resonate to a different range of frequencies, capacity surfaces spaced slight distances therefrom, and means for securing said parts in position and for electrically connecting together said capacity surfaces, and the portions of said movable plate means.

20. In an electrostatic telephone, the combination of diaphragm means, comprising a plurality of annuli of varying width, one surrounding the other, fixed means providing capacity surfaces, each comprising an annulus of varying width, spaced slight distances from said diaphragm annuli, and means for securing said means in position.

21. In an electrostatic telephone, the combination of diaphragm means, comprising a plurality of annuli of varying width, one surrounding the other, fixed means providing capacity surfaces, each comprising an annulus of varying width, spaced slight distances from said diaphragm annuli, and means for securing said means in position, said fixed means having circular openings extending therethrough from said capacity surfaces.

22. In an electrostatic telephone, the combination of a fixed condenser plate having an annular capacity surface and annular seating surfaces at the outer and inner sides of said capacity surface, a diaphragm comprising a movable condenser element, and diaphragm-securing means comprising a spider construction having a rim portion adapted to be secured to said fixed plate, and means carried by said spider construction for clamping said diaphragm against said seating surfaces with the diaphragm spaced slightly from said capacity surface.

23. An electrostatic telephone with structure according to claim 13 and in which the diaphragm comprises conductive means forming a condenser plate cooperating with other condenser plate means secured in respect to the supporting means.

24. An electrostatic telephone with structure according to claim 13 and in which the diaphragm comprises conductive means forming a condenser plate cooperating with other condenser plate means secured in respect to the supporting means, said last named plate means being relatively rigid and having perforated portions cooperating with the diaphragm portions respectively and arranged in such proximity to the diaphragm as to have a limited damping effect thereon.

25. An electrostatic telephone with structure according to claim 13 and in which the diaphragm comprises conductive means forming a condenser plate.

26. In a telephone, the combination of a diaphragm having a plurality of separated parts each having a plurality of different natural rates of vibration, supporting means, and means for securing said diaphragm thereto under tension and for separating the parts of said diaphragm, each of said diaphragm parts being responsive to various frequencies and having no decided natural rate of vibration as a whole.

27. In an electrostatic telephone, the combination of a diaphragm comprising conductive means and having a plurality of separated parts, each of said diaphragm parts having a plurality of different natural rates of vibration and said parts being responsive to various frequencies but having no decided natural rate of vibration as a whole, supporting means, means for securing said diaphragm thereto under tension, and means for separating the parts of said diaphragm, comprising relatively rigid condenser plate means.

28. In an electrostatic telephone, the combination of a diaphragm comprising conductive means and having a plurality of separated parts, each of said diaphragm parts having a plurality of different natural rates of vibration and said parts being responsive to various frequencies but having no decided natural rate of vibration as a whole, supporting means, means for securing said diaphragm thereto under tension, and means for separating the parts of said diaphragm, comprising relatively rigid condenser plate means having perforated capacity areas cooperating in damping relationship with said diaphragm parts respectively, other areas of said plate means firmly engaging the diaphragm along the dividing lines of the diaphragm portions.

29. An electrostatic telephone with structure according to claim 13 and in which the diaphragm comprises conductive means forming a condenser plate cooperating with other condenser plate means secured in respect to the supporting means, the diaphragm being calculated to resonate locally to various frequencies and under the control of a limited damping effect provided by said last named plate means.

30. An electrostatic telephone with structure according to claim 2, the diaphragm and plate comprising opposed capacity areas.

31. An electrostatic telephone with structure according to claim 11, the diaphragm and plate comprising opposed capacity areas.

32. An electrostatic telephone with structure according to claim 12 and in which the vibratory areas of the diaphragm are provided with a conductive coating, the edges of the diaphragm at the securing means being free of such coating.

33. An electrostatic telephone with structure according to claim 13 and in which the diaphragm cooperates with relatively fixed capacity areas, the vibratory areas of the diaphragm being provided with a conductive coating, the edges of the diaphragm at the securing means being free of such coating.

34. An electrostatic telephone with structure according to claim 13 and in which the diaphragm cooperates with a relatively fixed capacity member, portions of said fixed member engaging the diaphragm to divide the diaphragm into a plurality of strips comprising the separated diaphragm parts.

35. An electrostatic telephone with structure according to claim 13 and in which the diaphragm cooperates with a relatively fixed capacity member, portions of said fixed member engaging the diaphragm along extended predetermined lines to divide the diaphragm into a plurality of strips comprising the separated diaphragm parts.

36. An electrostatic telephone with structure according to claim 12 and in which portions on said plate engage the diaphragm to divide the diaphragm into a plurality of strips each possessing no decided natural rate of vibration.

37. An electrostatic telephone with structure according to claim 12 and in which portions on said plate engage the diaphragm to divide the diaphragm into a plurality of separately vibratory portions each possessing no decided natural rate of vibration.

38. An electrostatic telephone with structure according to claim 12 and in which portions on said plate engage the diaphragm along extended predetermined lines to divide the diaphragm into a plurality of strips each possessing no decided natural rate of vibration.

39. An electrostatic telephone with structure according to claim 11 and in which portions on said plate engage the diaphragm to divide the diaphragm into a plurality of strips each possessing no decided natural rate of vibration.

40. An electrostatic telephone with structure according to calim 11 and in which portions on said plate engage the diaphragm to divide the diaphragm into a plurality of separately vibratory portions each possessing no decided natural rate of vibration.

41. An electrostatic telephone with structure according to claim 11 and in which portions on said plate engage the diaphragm along extended predetermined lines to divide the diaphragm into a plurality of strips each possessiing no decided natural rate of vibration.

42. In an electrostatic telephone, the combination of a diaphragm comprising conductive means and having a plurality of separated parts, comprising separately vibratory strips, each of said diaphragm parts having a plurality of different natural rates of vibration and said parts being responsive to various frequencies but having no decided natural rate of vibration as a whole, supporting means, means for securing said diaphragm thereto under tension, and means for separating the parts of said diaphragm, comprising relatively rigid condenser plate means.

43. In an electrostatic telephone, the combination of a diaphragm comprising conductive means and having a plurality of separated parts, comprising extended relatively narrow areas, each of said diaphragm parts having a plurality of different natural rates of vibration and said parts being responsive to various frequencies but having no decided natural rate of vibration as a whole, supporting means, means for securing said diaphragm thereto under tension, and means for separating the parts of said diaphragm, comprising relatively rigid condenser plate means.

In testimony whereof, we have signed our names to this petition and specification.

JOSEPH MASSOLLE.
HANS VOGT.
JOSEF ENGL.